United States Patent Office 3,379,064
Patented Apr. 23, 1968

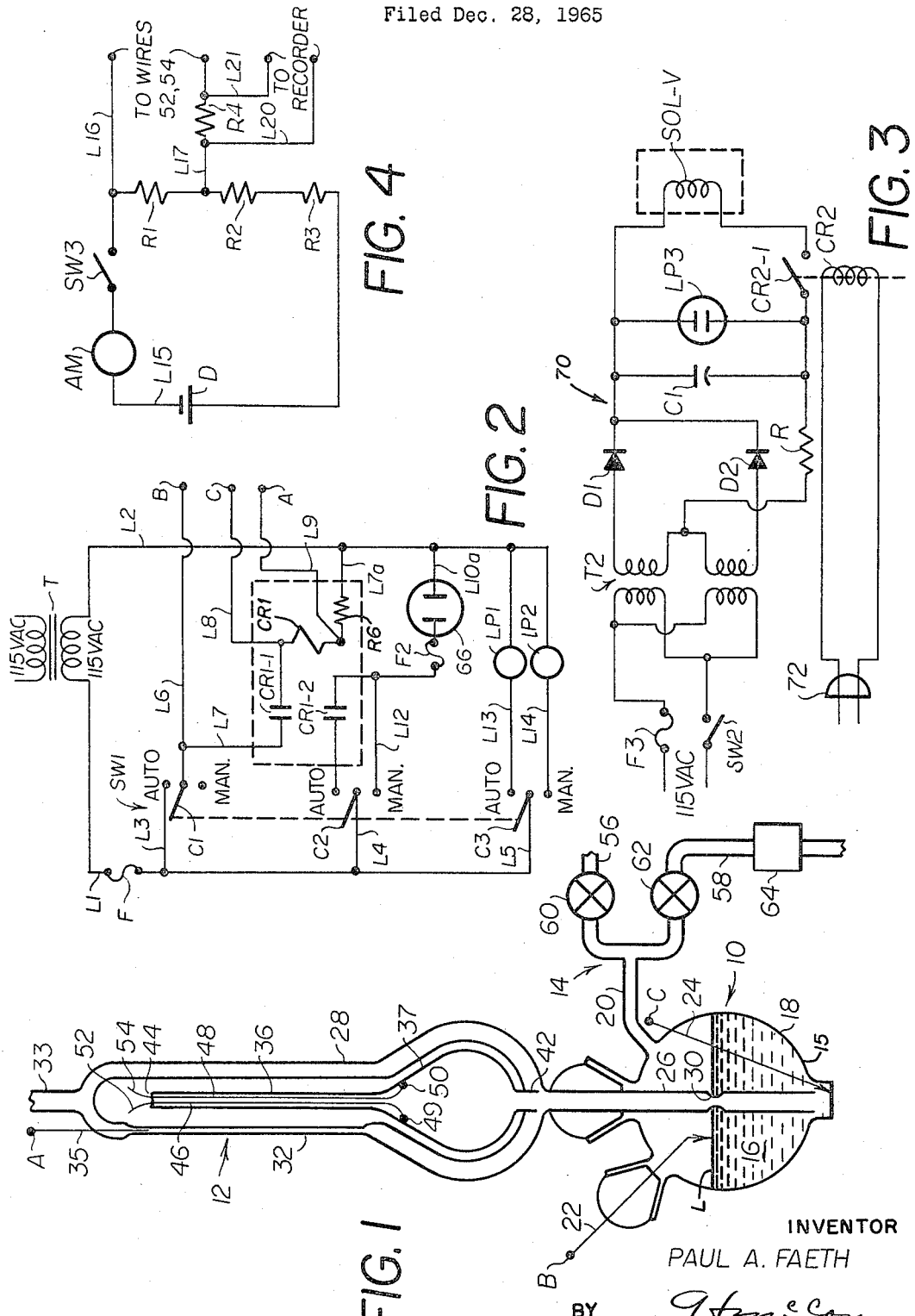

3,379,064
AUTOMATIC RECORDING McLEOD GAUGE
Paul A. Faeth, Cleveland, Ohio, assignor to the United States of America as represented by the Administrator of the National Aeronautics and Space Administration
Filed Dec. 28, 1965, Ser. No. 517,156
2 Claims. (Cl. 73—400)

ABSTRACT OF THE DISCLOSURE

A McLeod gauge having three electrodes disposed at various levels therein and also including a reservoir having an air bleed and connected to a vacuum source through a solenoid valve. The three electrodes are connected to a relay having a pair of contact sets and energized from an electrical power source. A current limiting resistor is connected serially with the relay winding. One of the sets of contacts is connected to a relay in a power supply section to cause the solenoid valve to close when the contact set closes. A pair of resistance wires are disposed in the McLeod gauge and connected to a recorder through a measuring circuit.

---

The invention described herein was made by an employee of the United States Government and may be manufactured and used by or for the Government for governmental purposes without the payment of any royalties thereon or therefor.

This invention relates to an improved McLeod gauge that automatically measures and records gas pressures.

McLeod gauges are conventionally used to measure low pressures. This is accomplished by trapping a predetermined volume of the gas to be measured and compressing the volume of gas to a known extent. The compressed gas increases in pressure and the pressure can be accurately measured by differential mercury column height. A McLeod gauge includes two capillary tubes that are vertically disposed and communicate with each other at their lower ends. One of the capillaries is sealed at the top and a large bulb of known volume is formed at its lower end. The other capillary is open at the top. The lower ends of both capillaries communicate with a reservoir of fluid, such as mercury. In operation, a large predetermined volume of gas at the pressure to be measured is trapped in the capillary tubes and bulb. Fluid, such as mercury, is introduced through the lower communicating ends of the tubes and compresses the gas trapped in the closed capillary and bulb. Due to the increase in pressure caused by the compression of the trapped gas, the fluid does not rise as far in the closed capillary as in the open capillary. The height differential of the two mercury columns for a known decrease in volume of the trapped gas is a measure of the absolute pressure in the system being tested.

Conventional McLeod type pressure gauges are operated manually, measurements are made visually, and the gauge is non-recording. As a result, measurements made with the gauge are time consuming, difficult, and provide no permanent record.

In accordance with the present invention, a McLeod type gauge is provided in which the fluid, such as mercury, is automatically introduced to the capillaries to trap and compress the gas being measured and to provide continuing cycles of measurement. The height to which the fluid rises in the open capillary is automatically controlled to a fixed level during each cycle, and the height to which the fluid rises in the closed, measuring, capillary is automatically sensed. Signals responsive to the height of the fluid in the closed capillary are produced and control a recorder, which indicates the height of fluid in the column and can be calibrated to directly indicate pressure.

A pump action similar to the operation of a Toepler pump is used to cause mercury in a reservoir to rise and recede into the measuring volumes of the gauge for each cycle of pressure measurement. The flow of fluid from the reservoir to the capillaries and back is produced and controlled by increasing and reducing the air pressure above the fluid in the reservoir.

Three electrodes are sealed into the gauge and in part control the cycles of pressure measurement by sensing the level of mercury in the reservoir and in the open capillary of the measuring volumes. An electrical circuit controls the variation in pressure within the reservoir and is responsive to the level of fluid in the reservoir and in the open capillary, as sensed by the electrodes.

A second electrical circuit and a pair of platinum wires in the closed capillary measure the height of the mercury column in the closed capillary. As the mercury rises in the closed capillary, portions of the platinum wires become covered by mercury and the resistance of the wires changes in proportion to the height of the mercury, giving a measure of the gas pressure in the system. The change in resistance is used to control a recorder that makes a permanent and accurate record of the pressure measured.

The device of this invention has many advantages over the conventional, manually operated and visually read McLeod gauge including: (1) the improved ease of operation; (2) the decreased time needed to obtain measurements as compared with the manual operation and reading of such a gauge; (3) the improved accuracy over visual readings; (4) the establishment of a permanent record of pressure changes in the system being measured; and, (5) the convenient programing of measuring cycles that is now possible, using an automatic timer.

Accordingly, it is an object of this invention to provide a gauge of the McLeod type for measuring low pressures automatically and for making a permanent record of the pressures measured.

Other objects, features and advantages of this invention will become more apparent as the same become better understood with reference to the following detailed description when taken in conjunction with the accompanying drawings, in which:

FIGURE 1 is a diagrammatic showing of an automatic recording McLeod gauge, constructed in accordance with the present invention;

FIGURE 2 is a control circuit diagram that automatically controls the rise and fall of fluid within the gauge;

FIGURE 3 is a control circuit diagram actuated from the control circuit of FIGURE 2, controlling a vacuum solenoid for controlling the pressure in the gauge reservoir; and FIGURE 4 is a diagrammatic measuring circuit used to control a recorder for making a permanent record of the pressure measured by the gauge.

Referring now to the drawings, and in particular to FIGURE 1, a McLeod type gauge is shown constructed in accordance with the present invention. The gauge includes a reservoir 10, measuring volumes 12, and a pressure control system 14 for the reservoir 10. The reservoir 10 contains a quantity of fluid, such as mercury 16, that is caused to rise and fall by the pressure control system 14 and hence flow into the measuring volumes 12. The measuring volumes 12 trap a quantity of test gas, the pressure of which is to be measured, and the rising mercury in the measuring volumes 12 compresses the trapped gas and provides a pressure measurement.

In the embodiment shown in FIGURE 1, the reservoir 10 is a spherical glassware container 15. The container is of sufficient size to hold enough mercury 16 to perform the measuring function in the volumes 12 with some mercury still remaining in the reservoir. When the mercury 16 has receded from the measuring volumes, it reaches a level L in the reservoir. A conduit 20 extends from the container 15 at a location above the level L and connects with the pressure control system 14. Two electrodes 22, 24 extend from outside the container 15 into the container. A lower end of the electrode 22 terminates within the container at the surface L and controls the upper level of the mercury 16 in the reservoir in a manner to be described. The electrode 24 extends into the container from above the level L to the bottom of the container and continually contacts the mercury 16 throughout the measuring cycle, during which the mercury level in the container 15 falls below the level L.

A vertical tube 26 is supported by the container 15 and extends from within and adjacent the bottom of the container upward through the top of the container and communicates with a tube loop 28. A constriction 30 is formed in the tube 26 to control the flow of liquid. Except for this tube 26 and the conduit 20 to the pressure control system, the container 15 is sealed closed.

The tube loop 28 has a vertical capillary portion 32 and a conduit 33 at its upper end that communicates with the source of gas being measured. An electrode 35 is positioned at the upper end of the open capillary 32. The electrode extends from outside the tube 28, through the tube wall and into the upper end of the capillary, extending downward a predetermined distance.

A closed capillary 36 extends parallel to the open capillary with the lower end of each at the same level and with the upper closed end 44 of capillary 36 at the level of the bottom of the electrode 35.

A bulb 37 of a predetermined, known, capacity is formed below the lower end of the closed capillary 36 and communicates via a conduit 42 at its lower end with the lower portion of the tube loop 28. The open and closed capillaries and the bulb 37 form the measuring volumes 12. Two spaced platinum wires 46, 48 extend from points of connections 49, 50 within the bulb 34 through the capillary 36 and out the sealed end 44, where they connect via leads 52, 54 with a measuring circuit to be described.

With the above described construction, air at the pressure to be measured enters the conduit 33 and the tube loop 28, filling the measuring volumes. When mercury from the reservoir 10 is caused to rise through the tube 26 to the loop tube 28 and covers the end of conduit 42, gas under the pressure to be measured is trapped within the bulb 37 and capillary 36. Additional mercury is supplied from the reservoir 10, filling the bulb 37, and compressing the volume of gas within the bulb 34 into the capillary 36. At the same time, the mercury rises through the tube loop 28 and capillary portion 32. The mercury will continue to rise in the open capillary 32 until it reaches the lower end of the electrode 35. The mercury will rise in the closed capillary 36 to a level where the pressure in the capillary 36 balances the higher column of mercury in the open capillary 32. When the mercury reaches electrode 35 it is caused to recede from the measuring volumes 12 under the control of the pressure control system 14 and associated control circuits, described in detail below. The distance the mercury rises in the closed capillary 36 for the known rise in the capillary 32 is a measure of the gas pressure in the system communicating to the gauge through conduit 33. The mercury in the closed capillary 36 bridges the two platinum wires 46, 48, changing their effective length. Hence the resistance of the wires varies with the height of the mercury column and, conversely, the change in resistance is indicative of the level of mercury in the capillary 36. The change in resistance is detected by an electrical circuit and monitored by a recorder.

The pressure control system 14 causes the mercury in the reservoir 10 to rise and recede into the measuring volumes 12 by bleeding air in or withdrawing air from the reservoir. An inlet capillary tube 56 and outlet tube 58 both communicate with the conduit 20 from the container 15. A valve, such as a stopcock 60, is provided in the capillary tube 56 and a valve, such as a stopcock 62, is provided in the tube 58. A solenoid valve 64 is also provided in the tube 58.

The mercury in the reservoir 10 is caused to rise through the tube 26 and measuring volumes 12 when air under atmospheric pressure, which is higher than the pressure of the system being measured, is bled into the reservoir 10 through the capillary tube 56, stopcock 60 and conduit 20. The mercury level is caused to recede from the measuring volumes 12 when air is removed from the reservoir 10 through the conduit 20, stopcock 62, tube 58 and solenoid valve 64 at a faster rate than it is being bled in through the capillary tube 56. A vacuum source, such as pump (not shown) is connected to tube 58 to withdraw air from the reservoir 10 under control of the solenoid valve 64.

As soon as the mercury rises into the measuring volumes 12 in response to air bled in through tube 56, it falls below the level L in the reservoir 10 and breaks the contact with the electrode 22. Contact is constantly maintained with the electrode 24, which extends the full effective height of the mercury 16 in the reservoir 10. The mercury continues to rise until it reaches electrode 35 in open capillary 32, and then recedes. When the mercury recedes back into the reservoir 10, the level rises to level L and again makes contact with the electrode 22. The manner in which the contact between the mercury and the electrodes 22, 30, 35 control the cycling of the mercury will be explained in detail in conjunction with the control circuits.

Circuits for controlling the cycling of liquid level in the reservoir 10 and measuring volumes 12 are shown in FIGURES 2 and 3 of the drawings. The circuit of FIGURE 2 is responsive to the level of mercury in the reservoir 10 and in the open capillary 32 and controls the energizing circuit of FIGURE 3 for the solenoid valve 64. This in turn controls the pressure in the reservoir above the liquid.

With reference first to FIGURE 2, a diagrammatic control circuit is shown having two parallel electrical lines L1, L2. These lines are connected to the secondary winding of an isolation transformer T connected to a 115 volt AC source (not shown). The transformer T isolates the AC circuit to eliminate ground loops from interfering with the DC measuring circuit.

A fuse F is provided in the line L1 and three lines L3, L4 and L5 are connected with the line L1. An automatic-manual switch SW1 is provided with three contactors C1, C2, C3, one associated with each of lines L3, L4, L5, respectively. The contactor C1 is connected with a line L6 which in turn is connected at point B to the point B of electrode 22, shown in FIGURE 1. A relay contact CR1–1, its relay coil CR1 and a current limiting resistor R6 are connected in series with the contactor C1 between lines L1 and L2 by lines L3, L6, L7 and L7a. A line L8 is connected with line L7 on one side of the coil relay CR1 and terminates at a point C, which is connected with the point C at the end of electrode 24 in FIGURE 1. A line L9 is connected with line L7a on the opposite side of the coil relay CR1 and terminates at a point A, which is connected with the point A at the end of the electrode 35 in FIGURE 1.

When the switch SW1 is set for automatic so that the contactor C1 connects line L3 with line L6, and when mercury in the reservoir 10 is at level L so as to contact the electrode 22 as well as the electrode 24, a circuit is completed between lines L1 and L2 through the coil relay CR1, via lines L3, contactor C1, line L6, point B and electrode 22, the mercury in the reservoir 10, the electrode 24 and point C, line L8, and line L7a. This energizes the coil relay CR1 and closes contact CR1–1 in line L7. This holds the coil relay CR1 energized by completing a circuit from line L1 to line L2 via lines L3, contactor C1, line L6, line L7, and line L7a. This holds the relay CR1 energized even though connection between points B and C initially made by the mercury 16 in the reservoir 10 is broken as the mercury level drops in the reservoir. From the circuit it will also be seen that when a connection is made between points C and A, as occurs when the mercury rises in the open capillary 32 and contacts the electrode 35, the coil relay CR1 is shorted out and contact CR1–1 is opened, deenergizing the relay.

A second set of relay contacts CR1–2 controlled by relay CR1 are provided in a line L10 associated with the contactor C2 of the switch SW1. The line L10 is connected via a fuse F2 to one side of a vacuum pump control receptacle 66. The other side of the receptacle is connected by a line L10a to the line L2. A line L12 also associated with the contactor C2 is connected from the contactor C2 directly to the line L10, bypassing the coil relay contacts CR1–2. With the switch SW1 on automatic, the contactor C2 connects line L4 with line L10. When coil relay CR1 is energized, the normally opened contacts CR1–2 are closed, completing a circuit to the vacuum pump control receptacle 66. This receptacle receives the input leads of a control relay, to be described in connection with FIGURE 3.

Two parallel lines L13, L14, both connected to line L2 are associated with contactor C3 of the switch SW1. Indicating lamps LP1, LP2 are associated with the lines L13, L14, respectively. Depending upon whether the switch SW1 is set to automatic or to manual, the light LP1 or LP2 is energized, to give an indication of the condition of the circuit.

A conventional control circuit for a vacuum solenoid SOL–V is shown in FIGURE 3 of the drawings. A power supply circuit 70 is provided in which the primary windings of a transformer T2 are connected to a 115 volt AC source via a fuse F3 and a switch SW2. The power supply circuit 70 is conventional, and will not be described in detail but, as shown, includes two diodes D1, D2, a resistor R, a condenser C1, a post light LP3, a relay contact CR2–1 and the vacuum solenoid SOL–V, all connected to the secondary windings of the transformer T2, as shown. The solenoid SOL–V is energized only when the relay contacts CR2–1 are closed. The contacts CR2–1 are controlled by a control relay CR2 connected to by a plug 72 the vacuum pump receptacle 66 of the control circuit of FIGURE 2. The contacts CR2–1 in the power circuit 70 are normally closed and are opened when the relay CR2 is energized. Thus, the solenoid SOL–V is normally energized and maintains the solenoid valve 64 open to connect the reservoir 10 with the vacuum source via the tube 58.

The cycling of the mercury in the gauge can best be understood with reference to FIGURES 1, 2 and 3. With the switch SW1 set to automatic, and with the mercury 16 in the reservoir 10 at the level L in contact with the electrodes 22 and 24, relay CR1 in the control circuit of FIGURE 2 is energized via lines L3, L6, the mercury between the electrodes connected to points B and C, the line L8 and the line L7a. This closes relay contacts CR1–1 and CR1–2. Contacts CR1–1 maintain relay CR1 energized and contacts CR1–2 connect the vacuum control receptacle 66 to the source of current supply, energizing control relay CR2 in FIGURE 3. This opens contacts CR2–1, deenergizing the vacuum solenoid SOL–V so that the solenoid valve 64 closes. Air bleeds into the reservoir 10 through the capillary tube 56, stopcock 60 and conduit 20, forcing the mercury 16 upward through the vertical tube 26 and into the tube loop 28 and the bulb 37. As soon as the mercury begins to rise, contact between the electrode 22 and the surface of the mercury in the reservoir 10 is broken. However, the now closed relay contacts CR1–1 maintain the relay CR1 energized. When the mercury reaches the upper end of the open capillary 32 and contacts electrode 35, an electrical connection is made between the points C and A in the circuit diagram of FIGURE 2, deenergizing the relay CR1. Contacts CR1–1 and CR1–2 open, deenergizing the control relay CR2 connected to the control circuit by the receptacle 66. As a result, the normally closed contacts CR2–1 close and the vacuum solenoid SOL–V is energized. This open the solenoid valve 64 in the vacuum tube 58 and communicates the interior of the reservoir 10 with the vacuum source. The vacuum source has sufficient capacity to override the air bleeding into the reservoir through the capillary tube 56 and exhausts the air from the reservoir. As a result, the mercury recedes back into the reservoir. The solenoid valve remains open until the mercury level reaches the level L when it contacts the lower end of the electrode 22, at which time the solenoid valve 64 closes and the cycle repeats. The period of each cycle can be adjusted within practical limits by controlling the air bleed and exhaust rates with the stopcocks 60 and 62.

The circuit for automatically measuring the pressure in the system tested is shown in FIGURE 4 of the drawings. A closed circuit is provided, consisting of a line L15, a battery such as a dry cell D, an ammeter AM, a switch SW3, a first resistor R1, a second resistor R2 and a third resistor R3. The resistors R2 and R3 constitute a means for adjusting the current in the closed circuit. Two lines L16 and L17 connected to the closed circuit L15 across the resistor R1 are connected to the leads 52, 54 of the two platinum resistance wires 46, 48 in the closed capillary 36. A resistor R4 is in the line L17 and a recorder (not shown) is connected across the resistor R4. In operation, as the mercury rises into the capillary 36, electrical contact is made between the two platinum wires 46, 48 via the mercury, which acts as a constant-resistance electrical bridge. The current passing through the exposed portion of the platinum wires passes through the standard resistor R4, and the current is monitored as a voltage changes. This voltage is recorded by a recorder connected across the resistor R4 by lines L20 and L21, and a calibration is established between the voltage and gas pressure.

From the above description of the apparatus and operation, it can be seen that an automatic recording McLeod gauge has been provided in which the pressure measuring cycles are automatically controlled and in which the pressure measured is automatically monitored and recorded. A specific example of the operation of such an automatic recording McLeod gauge is published in "The Review of Scientific Instruments," volume 36, No. 1, 106–107, January 1965, which is hereby incorporated herein by reference.

While a preferred embodiment of this invention and the operation thereof have been described with particularity, it will be understood that various modifications or alterations may be made therein without departing from the spirit and scope of the invention, as set forth in the appended claims.

What is claimed is:

1. In a gauge for measuring gas pressures, in combination, a reservoir containing an electrically conductive liquid, a plurality measuring volumes comprising an open capillary and a closed capillary connected to a bulb of known volume disposed below the measuring volumes, said open capillary being in communication with said closed capillary and said bulb, said closed capillary and said bulb both communicating with said reservoir by means of a tube extending downwardly from said measuring volumes into said reservoir, said tube terminating near the bottom of said reservoir, fluid level control means connected to said reservoir, fluid level control energizing means connected in controlling relationship to said fluid level control means, a first electrode disposed at the bottom in said reservoir, a second electrode disposed in said reservoir at the desired maximum liquid level in said reservoir, a third electrode disposed in one of said measuring volumes at the desired maximum liquid level in said measuring volumes, an electrical power source, a relay having a winding and first and second contact sets which close when the relay is energized, a current limiting resistor, means for serially connecting said relay winding and said current limiting resistor between one side of said electrical power source and said first electrode, means for connecting said second electrode to the other side of said electrical power source whereby when the liquid in said reservoir contacts said second electrode, current will flow through said relay winding, means for connecting said first set of relay contacts between said relay winding and said other side of said electrical power source whereby current will continue to flow through said relay winding when the liquid level in said reservoir recedes from said second electrode, means for connecting said third electrode to a point between said relay winding and said current limiting resistor whereby when the liquid level in said measuring volumes contacts said third electrode said relay winding is shorted out thereby causing said first and second sets of contaces to open means for connecting said electrical power source to said fluid level control energizing means, said last named means including said second set of relay contacts whereby when said second set of contacts is closed liquid transfers from said reservoir into said measuring volumes, measuring circuit means including a pair of spaced resistance wires disposed in said closed capillary, a recorder, means for connecting said recorder to said measuring circuit whereby the liquid level variations in said measuring volumes are recorded.

2. The gauge of claim 1 in which the liquid level control means comprises an air bleed connected to said reservoir and means for applying vacuum to the interior of said reservoir, said last named means including a solenoid valve having a coil, an electromagnetic switch having a normally closed set of contacts and a coil, means for serially connecting said set of contacts of said electromagnetic switch and said coil of said solenoid across said source of electrical power, means for connecting said coil of said electromagnetic switch means across said source of electrical power through said second set of relay contacts whereby when said second set of relay contacts closes the contacts of said electromagnetic switch open to deenergize said solenoid thereby shutting off vacuum for the reservoir.

References Cited
UNITED STATES PATENTS

| | | | |
|---|---|---|---|
| 2,738,678 | 3/1956 | Cherry et al. | 73—398 |
| 2,743,340 | 4/1956 | Zoltanski | 73—398 XR |
| 3,217,545 | 11/1965 | Kreisman | 73—400 |

FOREIGN PATENTS 12,128　3/1912　Great Britain.

DAVID SCHONBERG, *Primary Examiner.*

DONALD O. WOODIEL, *Examiner.*